(12) United States Patent
Rouge

(10) Patent No.: US 12,319,833 B2
(45) Date of Patent: Jun. 3, 2025

(54) LOW ODOR (METH)ACRYLATE COMPOSITIONS

(71) Applicant: TREMCO CPG INC., Beachwood, OH (US)

(72) Inventor: John Rouge, North Royalton, OH (US)

(73) Assignee: TREMCO CPG INC., Beachwood, OH (US)

( * ) Notice: Subject to any disclaimer, the term of this patent is extended or adjusted under 35 U.S.C. 154(b) by 727 days.

(21) Appl. No.: 17/440,442

(22) PCT Filed: Jan. 19, 2021

(86) PCT No.: PCT/US2021/013915
§ 371 (c)(1),
(2) Date: Sep. 17, 2021

(87) PCT Pub. No.: WO2021/158357
PCT Pub. Date: Aug. 12, 2021

(65) Prior Publication Data
US 2023/0167306 A1    Jun. 1, 2023

Related U.S. Application Data

(60) Provisional application No. 62/971,318, filed on Feb. 7, 2020.

(51) Int. Cl.
*C09D 4/06* (2006.01)

(52) U.S. Cl.
CPC ...................... *C09D 4/06* (2013.01)

(58) Field of Classification Search
CPC .. C09D 4/06; C08F 290/067; C08F 220/1807; C08F 222/102
See application file for complete search history.

(56) References Cited

U.S. PATENT DOCUMENTS

| | | | |
|---|---|---|---|
| 5,127,414 A | 7/1992 | Mast et al. | |
| 7,049,355 B2 * | 5/2006 | Quis | C09D 4/06 526/323.2 |
| 9,657,191 B2 * | 5/2017 | Zhao | C09D 151/003 |
| 2002/0002259 A1 | 1/2002 | Quis et al. | |
| 2004/0253383 A1 | 12/2004 | Belik et al. | |
| 2015/0191622 A1 | 7/2015 | Zhao et al. | |

FOREIGN PATENT DOCUMENTS

| | | | |
|---|---|---|---|
| JP | 2013177616 A | | 9/2013 |
| JP | 2017043703 A | * | 3/2017 |
| JP | 2018131622 A | * | 8/2018 |
| JP | 2019077854 A | * | 5/2019 |

OTHER PUBLICATIONS

Machine translation of JP2018131622A (Year: 2018).*
Machine translation of JP 2019-077854 (Year: 2019).*
Machine translation of JP 2017-043703 (Year: 2017).*
International Search Report and Written Opinion from PCT/US2021/013915 dated Mar. 31, 2021 (12 pages).

* cited by examiner

*Primary Examiner* — Doris L Lee
(74) *Attorney, Agent, or Firm* — Calfee, Halter & Griswold LLP

(57) ABSTRACT

A low odor liquid coating compositions coating composition that includes: 10 wt % to 95% wt % based upon the total weight of the solids in the coating composition of a monofunctional (meth)acrylate monomer that has a boiling point of 120 C or more at atmospheric pressure; 0.2 wt % to 5 wt % based upon the total weight of the solids in the coating composition of an oleophilic compound selected from a wax, an oil, or combination thereof; 1 pbw to 20 pbw based upon 100 parts by weight of the total weight of the solids in the coating composition of a hydrocarbon solvent, halocarbon solvent, or a combination thereof; and a multifunctional crosslinker selected from a multi-functional (meth)acrylate monomer, a multi-functional oligomer, and combinations thereof with the proviso that the multi-functional (meth) acrylate monomer does not exceed 5 wt % based upon the total weight of the solids in the coating composition.

21 Claims, No Drawings

LOW ODOR (METH)ACRYLATE COMPOSITIONS

CROSS-REFERENCE TO RELATED APPLICATION

This application is the U.S. National Stage entry of International Application No. PCT/US2021/013915, filed Jan. 19, 2021, which is based on, and claims the benefit of, U.S. Provisional Application Ser. No. 62/971,318, filed Feb. 7, 2020, the entire disclosures of which are incorporated herein by reference.

FIELD

The present disclosure relates to low odor (meth)acrylate coating compositions and coatings prepared therefrom that include a small amount of a hydrocarbon solvent, fluorocarbon solvent, or a combination thereof.

BACKGROUND

Low odor (meth)acrylate liquid coating compositions are known in the art. Examples of Low odor (meth)acrylate liquid coating compositions are described in U.S. Pat. Nos. 7,049,355 and 9,657,191, the disclosures of which are incorporated herein in their entireties.

A problem associated with liquid coating compositions of this type, especially when thinner coatings are desired, is inadequate cure of the coating's surface. To overcome this problem, an oleophilic compound is employed, such as inert wax or oil, that is capable of rising to the surface of the applied liquid coating. As explained in the above-noted '355 and '191 patents, this inert wax or oil is believed to rise to the coating's surface during curing where it is believed to form an oxygen barrier which prevents atmospheric oxygen from quenching the free radicals generated by the peroxide or other accelerator during cure.

In addition to the use of oleophilic compounds, such as waxes and oils, to prevent tackiness on the surface of the low odor (meth)acrylate coating compositions, multi-functional (meth)acrylate monomers are sometimes employed to increase crosslink density throughout the compound including the surface, which can cause a reduction in tack at the surface. While the use of multifunctional monomers may reduce surface tackiness in low odor (meth)acrylate liquid coatings, their use increases the rigidity of coating, which restricts the use of the coating to certain applications.

SUMMARY

Disclosed herein are low odor (meth)acrylate compositions that include a small amount of a hydrocarbon solvent, halocarbon solvent, or a combination thereof. To illustrate various aspects of the present disclosure, several exemplary embodiments of low odor (meth)acrylate compositions are provided.

In accordance with the present disclosure, a coating composition is provided that includes 10 wt % to 95% wt % based upon the total weight of the solids in the coating composition of a mono-functional (meth)acrylate monomer that has a boiling point of 120° C. or more at atmospheric pressure; 0.2 wt % to 5 wt % based upon the total weight of the solids in the coating composition of an oleophilic compound selected from a wax, an oil, or combination thereof; 1 pbw to 20 pbw based upon 100 parts by weight of the total weight of the solids in the coating composition of a hydrocarbon solvent, halocarbon solvent, or a combination thereof; and a multifunctional crosslinker selected from a multi-functional (meth)acrylate monomer, a multi-functional oligomer, and combinations thereof with the proviso that the multi-functional (meth)acrylate monomer does not exceed 5 wt % based upon the total weight of the solids in the coating composition.

In accordance with the present disclosure, a method of preparing a coated substrate is provided that includes applying a coating composition to a surface of a substrate, the coating composition comprising: 10 wt % to 95% wt % based upon the total weight of the solids in the coating composition of a mono-functional (meth)acrylate monomer that has a boiling point of 120° C. or more at atmospheric pressure; 0.2 wt % to 5 wt % based upon the total weight of the solids in the coating composition of an oleophilic compound selected from a wax, an oil, or combination thereof; 1 pbw to 20 pbw based upon 100 parts by weight of the total weight of the solids in the coating composition of a hydrocarbon solvent, halocarbon solvent, or a combination thereof; and a multifunctional crosslinker selected from a multi-functional (meth)acrylate monomer, a multi-functional oligomer, and combinations thereof with the proviso that the multi-functional (meth)acrylate monomer does not exceed 5 wt % based upon the total weight of the solids in the coating composition; and a polymerization initiator.

In accordance with the present disclosure, a coated substrate is provided that includes a substrate that includes a surface; a coating on the surface of the substrate, the coating formed from the reaction product of a coating composition that includes: 10 wt % to 95% wt % based upon the total weight of the solids in the coating composition of a mono-functional (meth)acrylate monomer that has a boiling point of 120° C. or more at atmospheric pressure; 0.2 wt % to 5 wt % based upon the total weight of the solids in the coating composition of an oleophilic compound selected from a wax, an oil, or combination thereof; 1 pbw to 20 pbw based upon 100 parts by weight of the total weight of the solids in the coating composition of a hydrocarbon solvent, halocarbon solvent, or a combination thereof; and a multifunctional crosslinker selected from a multi-functional (meth)acrylate monomer, a multi-functional oligomer, and combinations thereof with the proviso that the multi-functional (meth) acrylate monomer does not exceed 5 wt % based upon the total weight of the solids in the coating composition; and a polymerization initiator.

Numerous other aspects, advantages, and/or features of the general inventive concepts will become more readily apparent from the following detailed description of exemplary embodiments and from the claims.

DETAILED DESCRIPTION

The present disclosure is directed, at least in part, to a low odor (meth)acrylate coating composition and coatings prepared from the low odor (meth)acrylate coating composition. The low odor (meth)acrylate coating composition includes a mono-functional (meth)acrylate monomer that has a boiling point of 120° C. or more at atmospheric pressure, an oleophilic compound, a solvent, and a multifunctional crosslinker. It has been found that the inclusion of a small amount of a solvent allows the low odor (meth) acrylate coating composition to have advantageous curing properties while employing low amounts of oleophilic compounds and low amounts or no multi-functional (meth) acrylate monomers. While not wishing to be bound by any particular theory, it is believed that the solvent allows for the oleophilic compound to have better fluidity in the low odor (meth)acrylate coating composition, which improves the ability of the oleophilic compound to bloom to the surface of the low odor (meth)acrylate coating composition and prevent inhibition of the polymerization by atmospheric oxygen.

For the purposes of the present disclosure, the low odor (meth)acrylate coating composition may simply be referred to as the coating composition. While the coating composition of the present disclosure includes a solvent, the reactive compounds such as the monomers employed in the coating composition primarily provide fluidity to the coating composition. Stated differently, the monomers (e.g., the mono-functional (meth)acrylate monomers that has a boiling point of 120° C. or more at atmospheric pressure) act as reactive diluents in the coating composition.

As indicated above, the coating composition of the present disclosure includes a mono-functional (meth)acrylate monomer that has a boiling point of 120° C. or more at atmospheric pressure. In accordance with the present disclosure, the mono-functional (meth)acrylate monomer that has a boiling point of 120° C. or more at atmospheric pressure is an acrylate compound with a single ethylenically unsaturated functional group. The use of a mono-functional (meth)acrylate monomer with a boiling point of 120° C. or more at atmospheric pressure allows the coating composition to achieve the desired low odor property. Accordingly, the mono-functional (meth)acrylate monomer with a boiling point of 120° C. or more at atmospheric pressure may also be referred to as the low-odor (meth)acrylate monomer in the present disclosure. In accordance with the present disclosure, the low-odor (meth)acrylate monomer may have a boiling point that is greater than 120° C., greater than 140° C., greater than 160° C., greater than 180° C., or greater than 200° C. In accordance with the present disclosure, the low-odor (meth)acrylate monomer may have a boiling point that is in the range of 120° C. to 300° C., in the range of 140° C. to 280° C., in the range of 160° C. to 260° C., is in the range of 180° C. to 250° C., or in the range of 200° C. to 240° C.

Suitable mono-functional (meth)acrylate monomers that have boiling points of 120° C. or greater include, but are not limited to, benzyl methacrylate, hydroxyethyl methacrylate, and combinations thereof.

In accordance with the present disclosure, the coating composition may be characterized by the weight percentage of the low-odor (meth)acrylate monomer based upon the total weight of the solids in the coating composition. For the purpose of the present disclosure, the use of the term "solids" in the coating compositions refers any compound that is capable of reacting in an additive fashion to form a larger molecule during polymerization and any additive this is not lost as volatile matter per EPA method 24. EPA method 24 incorporates ASTM Standard Test Method ASTM D2369-10(2015)e1 to determine the weight percent volatile content of solvent-borne and waterborne coatings. Test specimens are weighed into an aluminum dish and then heated at 110±5° C. for 60 min. The weight of volatile compounds are determined by subtracting the weight after heating from the weight before heating. In accordance with the present disclosure, the coating composition may include greater than 10 wt %, greater than 20 wt %, greater than 30 wt %, greater than 40 wt %, or greater than 45 wt % of the low-odor (meth)acrylate monomer based upon the total weight of the solids in the coating composition. In accordance with the present disclosure, the coating composition may include less than 95 wt %, less than 80 wt %, less than 70 wt %, less than 60 wt %, or less than 55 wt % of the low-odor (meth)acrylate monomer based upon the total weight of the solids in the coating composition. In accordance with the present disclosure, the coating composition may include the low-odor (meth)acrylate monomer in the range of 10 wt % to 95 wt %, in the range of 20 wt % to 80 wt %, in the range of 30 wt % to 70 wt %, in the range of 40 wt % to 60 wt %, or in the range of 45 wt % to 55 wt % based upon the total weight of the solids in the coating composition.

As indicated above, the coating composition of the present disclosure includes an oleophilic compound. The oleophilic compound includes waxes or oils that are capable of rising to the surface of the applied liquid coating can also be included. It is believed the oleophilic compound rises to the coating's surface during curing where it is believed to form an oxygen barrier which prevents atmospheric oxygen from quenching the free radicals during polymerization.

Suitable waxes useful as the oleophilic compound include, but are not limited to, paraffin waxes, microcrystalline waxes, carnauba waxes, beeswax, lanolin, whale oil, a polyolefin waxes, ceresin, candelilla waxes, Fischer-Tropsch waxes, montan waxes, polyethylene waxes, and combinations thereof.

Paraffins are linear hydrocarbons having the general formula $C_nH_{2n+2}$, where n is 10-70. In accordance with the present disclosure, the paraffin wax may be characterized by the melting point of the wax which may be determined using the cooling curve of the paraffin wax. In accordance with the present disclosure, the paraffin wax may have a melting point in the range of 40° C.-58° C., in the range of 58-62° C., and greater than or equal to 62° C. In accordance with the present disclosure, 1, 2, or 3 paraffin waxes with different melting points may be employed in the coating composition.

Suitable oils useful as the oleophilic compound include, but are not limited to, paraffinic oils, naphthenic oils, aromatic oils, plant oils, animal oils, synthetic hydrocarbon oils, and combinations thereof.

In accordance with the present disclosure, the coating composition may be characterized by the weight percentage of the oleophilic compound based upon the total weight of the solids in the coating composition. In accordance with the present disclosure, the coating composition may include greater than 0.2 wt %, greater than 0.4 wt %, greater than 0.45 wt %, or greater than 0.5 wt % of the oleophilic compound based upon the total weight of the solids in the coating composition. In accordance with the present disclosure, the coating composition may include less than 3 wt %, less than 2.5 wt %, less than 2 wt %, or less than 1.5 wt % of the oleophilic compound based upon the total weight of the solids in the coating composition. In accordance with the present disclosure, the coating composition may include the oleophilic compound in the range of 0.2 wt % to 3 wt %, in the range of 0.4 wt % to 2.5 wt %, in the range of 0.45 wt % to 2 wt %, or in the range of 0.5 wt % to 1.5 wt % based upon the total weight of the solids in the coating composition.

As indicated above, the coating composition of the present disclosure includes a solvent. The solvent may be selected from hydrocarbon solvents, halogenated solvents, or a combination thereof.

Suitable hydrocarbon solvents include cyclic, linear, or branched hydrocarbon compounds. In certain embodiments, the hydrocarbon solvents include less than 14, less than 13, and less than 12 carbon atoms. In certain embodiments, the hydrocarbon solvent may be aromatic. In accordance with the present disclosure, the hydrocarbon solvent may have 6 to 12, or 8 to 10 carbon atoms.

Exemplary hydrocarbon solvents include, but are not limited to hexane, heptane, cyclohexane, naphtha, mineral spirits, naphtha kerosene, octane, isooctane, and combinations thereof.

Suitable halocarbon solvents include cyclic, linear, or branched hydrocarbon compounds. In certain embodiments, the halocarbon solvents include less than 14, less than 13, and less than 12 carbon atoms and at least one hydrogen atom has been substituted by a halogen atom. Suitable halogen atoms include fluorine atoms, chlorine atoms, and bromine atoms. In certain embodiments, all of the hydrogen atoms have been substituted with halogen atoms. In certain embodiments, the halocarbon solvent may be aromatic. In accordance with the present disclosure, the halocarbon solvent may have 1 to 12, 3 to 10, and 5 to 7 carbon atoms.

Exemplary halocarbon solvents include, but are not limited to 2,3-dihydrodecafluoropentane (e.g., Vertrel XF available from DuPont), 1,1,1,2,3,4,4,5,5,5-Decafluoropentane, methylene chloride, Parachlorobenzotrifluoride (e.g., Oxsol 100 from Isle Chem), and combinations thereof.

In accordance with the present disclosure, the solvents (e.g., the hydrocarbon solvent or the halocarbon solvent) may be characterized by the vapor pressure at 25° C. In accordance with the present disclosure, the solvent has a vapor pressure at 25° C. of at least 0.10 mm Hg, at least 0.15 mm Hg, and at least 0.20 mm Hg. In accordance with the present disclosure, the solvent has a vapor pressure at 25° C. in the range of 0.10 mm Hg to 300 mm Hg, in the range of 0.15 mm Hg to 200 mm Hg, and in the range of 0.20 mm Hg to 100 mm Hg.

The coating compositions of this disclosure may be VOC compliant. In this context, "VOC compliant means that these compositions still contain no more than 250 grams of non-exempt volatile organic compounds per liter of composition, with "non-exempt" meaning solvents which are not listed on SCAQMD, Rule 102, Groups 1&2 (As Amended Oct. 19, 2001).

In accordance with the present disclosure, the coating composition may be characterized by a part by weight of the solvent compound based upon 100 parts of the total weight of the solids in the coating composition. In accordance with the present disclosure, the coating composition may include greater than 1 part by weight ("pbw"), greater than 2 pbw, greater than 2.5 pbw, greater than 3 pbw, or greater than 3.5 pbw of the solvent based upon 100 parts of the total weight of the solids in the coating composition. In accordance with the present disclosure, the coating composition may include less than 20 pbw, less than 16 pbw, less than 8 pbw, less than 6 pbw, or less than 5 pbw of the solvent based upon 100 parts of the total weight of the solids in the coating composition. In accordance with the present disclosure, the coating composition may include the solvent in the range of 1 pbw to 20 pbw, in the range of 2 pbw to 16 pbw, in the range of 2.5 pbw to 8 pbw, in the range of 3 pbw to 6 pbw, or in the range of 3.5 pbw to 5 pbw based upon 100 parts of the total weight of the solids in the coating composition.

As indicated above, the coating composition of the present disclosure includes a multi-functional crosslinker. Suitable multi-functional crosslinker include multi-functional (meth)acrylate monomers, multifunctional oligomers, and combinations thereof. Due to the short distance between polymerizable functional groups of the multi-functional (meth)acrylate monomer, the inclusion of these monomers for crosslinking produces a more rigid coating. Conversely, multifunctional oligomers have larger oligomeric chains between polymerizable functional groups, accordingly inclusion of the multifunctional oligomers result in a less rigid coating.

The multi-functional (meth)acrylate monomers includes at least two (meth)acrylate groups joined together by a linking group. Suitable multi-functional (meth)acrylate monomers may include two (meth)acrylate groups, three (meth)acrylate groups, and four or more (meth)acrylate groups.

In accordance with the present disclosure, the multi-functional (meth)acrylate monomer may be characterized by the molecular weight in grams per mole. In accordance with the present disclosure, the multi-functional (meth)acrylate monomer may be less than 500 g/mol, less than 475 g/mol, less than 450 g/mol, less than 425 g/mol, less than 400 g/mol, less than 350 g/mol, or less than 300 g/mol. In accordance with the present disclosure, the multi-functional (meth)acrylate monomer may be in the range of 125 g/mol to 500 g/mol, in the range of 150 g/mol to 450 g/mol, in the range of 175 g/mol to 400 g/mol, or in the range of 200 g/mol to 350 g/mol.

In accordance with the present disclosure, the multi-functional (meth)acrylate monomer may be a difunctional crosslinker defined by formula I.

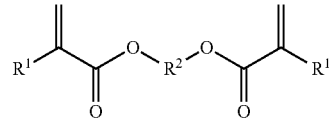

wherein each $R^1$ is individually a hydrogen atom or a methyl group and $R^2$ is a divalent organic group. Suitable divalent organic groups include cyclic, linear, or branched hydrocarbon groups that include 2 to 20, 4 to 18, 6 to 16, or 8 to 14 carbon atoms. In accordance with the present disclosure, the divalent organic group, $R^2$, may include a substitution at one or more hydrogen or carbon atoms with a heteroatom such as an oxygen atom, nitrogen atom, or a halogen atom. In accordance with the present disclosure, the divalent organic group, $R^2$, may include an oxyethylene group or two or more repeating oxyethylene groups (i.e., a polyethylene glycol).

In accordance with the present disclosure, the multi-functional (meth)acrylate monomer may be a trifunctional crosslinker defined by formula II.

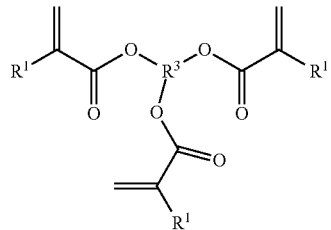

wherein each $R^1$ is individually a hydrogen atom or a methyl group and $R^3$ is a trivalent organic group. Suitable trivalent organic groups include cyclic, linear, or branched hydrocarbon groups that include 3 to 14, 5 to 12, 7 to 10, or 8 to 9 carbon atoms. In accordance with the present disclosure, the trivalent organic groups may include a substitution at one or more hydrogen or carbon atoms with a heteroatom such as an oxygen atom, nitrogen atom, or a halogen atom.

Suitable multi-functional (meth)acrylate monomers include, but are not limited to, ethylene glycol dimethacrylate, ethylene glycol diacrylate, diethylene glycol dimethacrylate, diethylene glycol diacrylate, triethylene glycol dimethacrylate, triethylene glycol diacrylate, butanediol dimethacrylate, hexanediol diacrylate, trimethylolpropane trimethacrylate, trimethylolpropane triacrylate, pentaerythrityl tetramethacrylate, pentaerythrityl tetraacrylate, and combinations thereof.

In accordance with the present disclosure, the coating composition may be characterized by the weight percentage of the multi-functional (meth)acrylate monomer based upon the total weight of the solids in the coating composition. In accordance with the present disclosure, the coating composition may include greater than or equal to 0 wt %, greater than 0.1 wt %, greater than 0.3 wt %, greater than 0.5 wt %, or greater than 1 wt % of the multi-functional (meth)acrylate monomer based upon the total weight of the solids in the coating composition. In accordance with the present disclosure, the coating composition may include less than 5 wt %, less than 4 wt %, less than 3 wt %, less than 2.5 wt %, or less than 2 wt % of the multi-functional (meth)acrylate monomer based upon the total weight of the solids in the coating composition. In accordance with the present disclosure, the coating composition may include the multi-functional (meth)acrylate monomer in the range of 0 wt % to 5 wt %, in the range of 0.1 wt % to 4 wt %, in the range of 0.3 wt % to 3 wt %, in the range of 0.5 wt % to 2.5 wt %, or in the range of 1 wt % to 2 wt % based upon the total weight of the solids in the coating composition. As indicated above, the multi-functional (meth)acrylate monomer increases the rigidity of the cured coating. When the amount of multi-functional (meth)acrylate monomer is greater than 3 wt %, the cured coating may become too rigid to be suitable for use with roof and/or parking decks.

Suitable multi-functional oligomers include oligomer molecules that include two or more functional groups that capable of reacting with a propagating polymer in the coating composition. In certain embodiments, the multi-functional oligomer may be a telechelic oligomer. In other embodiments, the multi-functional oligomer may include 3 or more functional groups randomly distributed on the oligomer. In certain embodiments, the functional groups of the multi-functional oligomer may be (meth)acrylate groups. In accordance with the present disclosure, the multi-functional oligomer may improve the flexibility of the cured coating composition.

In accordance with the present disclosure, the multi-functional oligomer may be characterized by the number of successively repeating mer units. In accordance with the present disclosure, the multi-functional oligomer may have repeating mer units in the range of 10 to 500, in the range of 20 to 200, and in the range of 50 to 75.

In accordance with the present disclosure, the multi-functional oligomer may be characterized by number average molecule weight. In accordance with the present disclosure, the multi-functional oligomer may have number average molecule weight greater than 500 g/mol, greater than 4,000 g/mol, and greater than 12,000 g/mol. In accordance with the present disclosure, the multi-functional oligomer may have number average molecule weight in the range of 500 g/mol to 25,000 g/mol, in the range of 1,000 g/mol to 20,000 g/mol, and in the range of 5,000 g/mol to 10,000 g/mol.

Suitable multi-functional oligomers include, but are not limited to, urethane (meth)acrylates, polyester (meth)acrylates, epoxy (meth)acrylates, acrylated (meth)acrylates, silicone (meth)acrylates, and combinations thereof.

In accordance with the present disclosure, the coating composition may be characterized by the weight percentage of the multi-functional oligomer based upon the total weight of the solids in the coating composition. In accordance with the present disclosure, the coating composition may include greater than or equal to 0 wt %, greater than 1 wt %, greater than 5 wt %, greater than 10 wt %, or greater than 30 wt % of the multi-functional oligomer based upon the total weight of the solids in the coating composition. In accordance with the present disclosure, the coating composition may include less than 80 wt %, less than 70 wt %, less than 60 wt %, less than 50 wt %, or less than 40 wt % of the multi-functional oligomer based upon the total weight of the solids in the coating composition. In accordance with the present disclosure, the coating composition may include the multi-functional oligomer in the range of 0 wt % to 80 wt %, in the range of 1 wt % to 70 wt %, in the range of 5 wt % to 60 wt %, in the range of 10 wt % to 50 wt %, or in the range of 30 wt % to 40 wt % based upon the total weight of the solids in the coating composition.

In accordance with the present disclosure, the coating composition may include a polymeric bead that is at least partially soluble in one of the system components. The polymeric bead may be non-reactive (e.g., it does not include a functional group reactive in the curing of the coating composition). In accordance with the present disclosure, the polymeric bead may be characterized by a molecular weight in the range of 1,000 g/mol to 200,000 g/mol.

Suitable polymers for preparing the polymer beads include thermoplastic polymers. In accordance with the present disclosure, the polymer beads may be prepared from acrylic polymers, styrene maleic anhydride copolymers, ethylene vinyl acetate, styrenic block copolymers, and combinations thereof. Suitable acrylic polymers for use in the polymer beads include, poly(methyl methacrylate), poly(methyl acrylate), and copolymers of methyl(methacrylate) such as poly(methyl methacrylate-co-butyl methacrylate).

In accordance with the present disclosure, the coating composition may include the polymeric bead in the range of 0 wt % to 50 wt %, in the range of 1 wt % to 48 wt %, in the range of 2 wt % to 45 wt %, in the range of 5 wt % to 40 wt %, in the range of 10 wt % to 35 wt %, or in the range of 20 wt % to 30 wt % based upon the total weight of the solids in the coating composition.

In accordance with the present disclosure, the coating composition may include a filler. Suitable fillers for us in the coating composition include, but are not limited to, talcum, cement, aggregates, sands, quartz (colored or non-colored), metal salts such as $CaCO_3$, $CaSO_4$, $BaSO_4$, metal oxides such as $TiO_2$, $SiO_2$, and ZnO, clay, aluminum trihydrate, and combinations thereof.

In accordance with the present disclosure, the coating composition may include the filler in the range of 0 wt % to 80 wt %, in the range of 1 wt % to 75 wt %, in the range of 5 wt % to 70 wt %, in the range of 10 wt % to 60 wt %, in the range of 20 wt % to 50 wt %, or in the range of 30 wt % to 40 wt % based upon the total weight of the solids in the coating composition.

While mono-functional (meth)acrylate monomers that have a boiling point of 120° C. or more are useful for their a low-odor properties, other mono-functional monomers may be include in the coating composition. In accordance with the present disclosure, the coating composition may include a mono-functional (meth)acrylate monomer with a boiling point of less than 120° C. at atmospheric pressure. Suitable mono-functional (meth)acrylate monomers with a boiling point of less than 120° C. at atmospheric pressure include, but are not limited to methyl acrylate, methyl methacrylate, butyl acrylate, butyl methacrylate, ethyl acrylate, propyl acrylate, and combinations thereof. In accordance with the present disclosure, the coating composition may include the mono-functional (meth)acrylate monomer in the range of in the range of 0 wt % to 5 wt %, in the range of 0.1 wt % to 4 wt %, in the range of 0.5 wt % to 3 wt %, or in the range of 1 wt % to 2 wt % based upon the total weight of the solids in the coating composition. In certain embodiments, the coating composition does not include a mono-functional (meth)acrylate monomer with a boiling point of less than 120° C. at atmospheric pressure.

In accordance with the present disclosure, the coating composition may include one or more additives selected from UV stabilizers (e.g., hindered amine light stabilizers), defoamers, pigments, dyes, anti-slip agents, anti-static agents, adhesion promoters, tackifiers, plasticizers, flow aids, wetting aids, rheology modifiers, nucleating agents, leveling agents, air releasing agents, fire retardants, thixotropic boosters, polymerization inhibitors, rheological additives, and combinations thereof.

The coating composition may be cured or polymerized by any conventional method for preparing an acrylate polymer or polymeric network. In accordance with the present disclosure, the coating composition may be initiated using a radical initiator. Suitable radical initiators include organic peroxides. Exemplary organic peroxides include but are not limited to benzoyl peroxide, methyl ethyl ketone peroxide, tert-butyl-2-ethylhexanoate, tert-butyl peroxyisopropyl carbonate, tert-butyl hydroperoxide, cumyl peroxide and combinations thereof. In accordance with the present disclosure, the coating composition may include the radical initiator in the range of 0.25 pbw to 10 pbw and in the range of 0.50 pbw to 5 pbw based upon 100 parts of the total weight of the solids in the coating composition. In accordance with the present disclosure, the curing of the coating composition may occur at temperatures in the range of −10° C. to 60° C., in the range of 0° C. to 50° C., in the range of 10° C. to 40° C., and in the range of 20° C. to 27° C.

In addition to the use of a radical initiator, one or more polymerization modifiers may be employed. Suitable polymerization modifiers include polymerization accelerators, chain-transfer agents, and combinations thereof. Exemplary polymerization accelerators include toluidines, N-substituted tertiary anilines, transition metal salts of organic acids, and combinations thereof. Those skilled in the art will appreciate that when a tertiary amine compound is employed with an organic peroxide initiator a redox curing system may be prepared.

Exemplary chain transfer agents include, but are not limited to dodecanethiol, esters of thioglycolic acid (TGA), esters of 3-mercaptopropionic acid (MPA), and combinations thereof.

In certain embodiments, the coating composition may be prepared by combining all of the individual components of the coating composition (including any polymerization modifiers, if desired) with the exception of the radical initiator. The radical initiator may then be combined with the coating composition and the composition may then be coated onto an appropriate substrate. In other embodiments, the coating composition may be prepared by combining all of the individual components of the coating composition with the exception of the radical initiator and polymerization modifiers. The radical initiator and polymerization modifiers may then be combined with the coating composition and the composition may then be coated onto an appropriate substrate. In still other embodiments, the low-odor (meth) acrylate and the oleophilic compound may be combined and heated to melt the oleophilic compound, if required. The mixture of the low-odor (meth)acrylate and the oleophilic compound may be cooled prior to the addition of the additional components of the coating composition. Additional cooling may be necessary prior to the inclusion of the solvent. The radical initiator may then be combined with the coating composition and the composition may then be coated onto an appropriate substrate. The polymerization modifiers may be added with the radical initiator or prior to the inclusion of the radical imitator.

The coating compositions of this disclosure can be applied to substrates by conventional, means, e.g., brush, roller, squeegee, trowel, spray, and the like, without heating. After the coating composition is applied and prior to the coating being completely cured, particulates such as sand, quartz, chips, flakes, etc. may be broadcast into the coating to form decorative coatings once cured. The coating composition may be applied to a horizontal or a vertical substrate. In certain embodiments, where the coating composition is applied to a horizontal substrate, the coating may be applied to form an air barrier on a wall. Those skilled in the art will appreciate that air barriers may include a silicone (meth)acrylate oligomer in the coating in order to increase water vapor permeability.

Single coating layers can be applied or multiple coating layers may be used. Thin films, e.g., 0.5 to 500 microns, and thick films, e.g., 60 mils or more, can be obtained from a single coat. Thicker film coatings are also possible from a single application, but multiple applications of the inventive liquid coating composition may be advantageous when thicker coatings are desired. For example, by applying multiple coating layers, coatings of up to 50 mils, 75 mils, 100 mils or 200 mils etc. can be produced.

In accordance with the present disclosure, the coating composition may be characterized by an elongation percentage, which may be determined according to ASTM D638-14, which is incorporated herein by reference, using a universal testing machine (e.g., an Instron). In accordance with the present disclosure, the coating composition may be characterized by an elongation of 0% to 500%. In accordance with the present disclosure, the coating composition may be characterized by an elongation of 0.5% to 10%, 2% to 8%, or 3% to 6%. In accordance with the present disclosure, the coating composition may be characterized by an elongation of 10% to 100%, 20% to 80%, or 30% to 70%. In accordance with the present disclosure, the coating composition may be characterized by an elongation of 100% to 500%, 150% to 500% or 200% to 400%.

Suitable substrates for coating with the coating compositions include wood, concrete, masonry, metals, plastics, ceramics, composites, asphalt, gypsum board, brick, insulation board, and tile. Examples of coated articles that can be made with the coating composition include but are not limited to both horizontal and vertical applications such as countertops, roofs, parking decks, bridges, floors, flooring panels, doors, architectural panels, walls, decorative panels, automotive applications, modified bitumen, and single ply membranes.

The coating compositions of this disclosure are particularly useful in roofing, parking decks, and infrastructure applications such as bridges, roadways and tunnels and flooring applications. For example, they can be used to make coatings on an installed floor. In addition, they can also be used as part of a flooring system which includes additional materials such as tiles, concrete slabs, planks, polymeric sheets etc. Roofing that may include coating compositions of this disclosure include concrete roofing. Additionally, the coating compositions of this disclosure may be used in roofing restorations. Accordingly, the coating compositions of this disclosure may be applied to asphalt-based roofing, tile roofing, etc. Furthermore, the coating compositions of the present disclosure may be used in vertical applications, such vapor barriers, on walls, sheathing, etc.

The substrates, such as concrete floors, coated by the composition of the disclosure typically comprise one or more of the following structural element/layers:
1) Primer/sealer (coated directly to the substrate)—typically 10 mil to 15 mil;
2) Body coat—typically 15-100 mils or thicker, one, two or more layers may be applied, in some embodiments multiple layers of 15-50 mils are applied. Any decorative features including coloring, pigments, quartz, or color chips may be broadcast on this layer. Additionally, particulates, such as sand, may be broadcast into this layer to provide a coating with an advantageous slip resistance. Optionally the body coat may be reinforced with fiberglass cloth or polyester fleece.
3) Top coat—15-30 mil and sometimes thicker, can comprise one or two such layers.

EXAMPLES

In order to more thoroughly describe the subject matter Applicant regards as its invention, the following working examples are provided:

Samples were prepared by combining a mixture that includes benzyl methacrylate, BHT, and paraffin wax and heating the mixture at 150° F. to melt the paraffin wax. After the paraffin wax melted and was incorporated into the mixture, the mixture was cooled to 120° F. The Neocryl 725 bead was added to the cooled mixture and mixed until it fully dissolved (e.g., became clear). The liquids were added next to the mixture with mixing. The liquids include Urethane Methacrylate Oligomer, Diisopropylparatoluidine, Tinuvin 292 HAL S, Diethyleneglycol Dimethacrylate, Afcona 2020 and Tween 20. After the liquids were added to the mixture, the powders were added. The powders include Barium Sulfate, Micral 532, Fire Retardant Filler, HDK N20 Fumed Silica and RAL 7035 Pigment Powder. High speed dispersion was used to fully incorporate the powders to the mixture. The mixture was then cooled to 100° F. prior to the addition of solvents (see Table 3). No solvents were added to prepare a comparative example (see Table 2.)

To prepare a coating, a 4% of a benzoyl peroxide initiator was added to the samples. The samples then coated by the drawdown method to prepare 80 mil coatings on a substrate within 3 minutes of the addition of the initiator. Coatings were prepared at 72° F. the cure quality was determined after the samples fully cured (e.g. after 1 hour). The use of "Good" in tables 2 and 3 refers to a coating that is tack free.

TABLE 1

Coating Formulation

| Raw Material Name | Description | Wt % |
| --- | --- | --- |
| Benzyl Methacrylate | Monomer | 24.22% |
| Paraffin | Wax | 1.20% |
| Diisopropylparatoluidine | Tertiary Amine Accelerator | 0.70% |
| BHT | Inhibitor | 0.03% |
| Tinuvin 292 HALS | Hindered Amine Light Stabilizer | 1.17% |
| Neocryl 725 | (Meth)acrylate (Co)polymer bead | 3.07% |
| Fire Retardant Filler | Fire Retardant | 2.92% |
| Barium Sulfate | Filler | 17.53% |
| Micral 532 | Fire Retardant | 17.53% |
| Urethane Methacrylate Oligomer | Urethane Methacrylate Oligomer | 26.48% |
| Diethyleneglycol Dimethacrylate | Di Functional Monomer | 1.00% |
| Afcona 2020 | Defoamer | 0.29% |
| Tween 20 | Thix Booster | 0.29% |
| HDK N20 Fumed Silica | Rheology Control | 0.64% |
| RAL 7035 Pigment Powder | Pigment | 2.92% |
| Total= | | 100.00% |

TABLE 2

Comparative Example

| Comparative Example | % Vertrel XF | % Hexane | % Isoctane | % Mineral Spirits | % Octane | % Cyclohexane | Cure Quality |
| --- | --- | --- | --- | --- | --- | --- | --- |
| 1 | 0.00 | 0.00 | 0.00 | 0.00 | 0.00 | 0.00 | Tacky |

TABLE 3

Examples

| Inventive Example | % Vertrel XF | % Hexane | % Isoctane | % Mineral Spirits | % Octane | % Cyclohexane | Cure Quality |
| --- | --- | --- | --- | --- | --- | --- | --- |
| 1 | 5.00 | 0.00 | 0.00 | 0.00 | 0.00 | 0.00 | Slight Tacky |
| 2 | 0.00 | 5.00 | 0.00 | 0.00 | 0.00 | 0.00 | Good |
| 3 | 0.00 | 0.00 | 5.00 | 0.00 | 0.00 | 0.00 | Good |
| 4 | 0.00 | 0.00 | 0.00 | 5.00 | 0.00 | 0.00 | Good |
| 5 | 0.00 | 0.00 | 0.00 | 0.00 | 5.00 | 0.00 | Good |
| 6 | 0.00 | 0.00 | 0.00 | 0.00 | 0.00 | 5.00 | Tacky |
| 7 | 2.50 | 0.00 | 0.00 | 0.00 | 0.00 | 0.00 | Tacky |
| 8 | 0.00 | 2.50 | 0.00 | 0.00 | 0.00 | 0.00 | Good |
| 9 | 0.00 | 0.00 | 2.50 | 0.00 | 0.00 | 0.00 | Good |
| 10 | 0.00 | 0.00 | 0.00 | 2.50 | 0.00 | 0.00 | Good |
| 11 | 0.00 | 0.00 | 0.00 | 0.00 | 2.50 | 0.00 | Good |
| 12 | 0.00 | 0.00 | 0.00 | 0.00 | 0.00 | 2.50 | Tacky |
| 13 | 2.50 | 2.50 | 0.00 | 0.00 | 0.00 | 0.00 | Good |
| 14 | 2.50 | 0.00 | 2.50 | 0.00 | 0.00 | 0.00 | Good |
| 16 | 2.50 | 0.00 | 0.00 | 2.50 | 0.00 | 0.00 | Good |
| 16 | 2.50 | 0.00 | 0.00 | 0.00 | 2.50 | 0.00 | Good |
| 17 | 2.50 | 0.00 | 0.00 | 0.00 | 0.00 | 2.50 | Good |
| 18 | 0.00 | 10.00 | 0.00 | 0.00 | 0.00 | 0.00 | Tacky |

While the present disclosure describes exemplary aspects of coating compositions, articles, and methods in detail, the present disclosure is not intended to be limited to the disclosed aspects. Also, certain elements of exemplary aspects disclosed herein are not limited to any exemplary aspects, but instead apply to all aspects of the present disclosure.

The terminology as set forth herein is for description of the aspects of this disclosures only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Furthermore, the phrase "at least one of A, B, and C" should be interpreted as "only A or only B or only C or any combinations thereof."

The coating compositions, articles, and associate methods of making the coating composition or the article of the present disclosure can comprise, consist of, or consist essentially of the essential elements of the disclosure as described herein, as well as any additional or optional element described herein or which is otherwise useful in coating applications.

All percentages, parts, and ratios as used herein are by weight of the total composition, unless otherwise specified. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 0) contained within the range.

Any combination of method or process steps as used herein may be performed in any order, unless otherwise specified or clearly implied to the contrary by the context in which the referenced combination is made.

What is claimed is:

1. A coating composition comprising:
   10 wt % to 95% wt % based upon the total weight of the solids in the coating composition of a mono-functional (meth)acrylate monomer that has a boiling point of 120° C. or more at atmospheric pressure;
   0.2 wt % to 5 wt % based upon the total weight of the solids in the coating composition of an oleophilic compound selected from a wax, an oil, or combination thereof;
   1 pbw to 5 pbw based upon 100 parts by weight of the total weight of the solids in the coating composition of a solvent; and
   a multifunctional crosslinker selected from a multi-functional (meth)acrylate monomer, a multi-functional oligomer, and combinations thereof with the proviso that the multi-functional (meth)acrylate monomer does not exceed 5 wt % based upon the total weight of the solids in the coating composition.

2. The coating composition of claim 1, where the coating composition further includes a polymerization initiator.

3. The coating composition of claim 2, where the coating composition further includes at least one of an accelerator and a chain-transfer agent.

4. The coating composition of claim 1, where the coating composition includes 1 wt % to 80 wt % based upon the total weight of the solids in the coating composition of the multi-functional oligomer.

5. The coating composition of claim 4, where the multi-functional oligomer is selected from the group consisting of urethane (meth)acrylates, polyester (meth)acrylates, epoxy (meth)acrylates, acrylated (meth)acrylates, silicone (meth)acrylates, and combinations thereof.

6. The coating composition of claim 4, where the multi-functional oligomer has a number average molecule weight in the range of 500 g/mol to 25,000 g/mol.

7. The coating composition of claim 1, where the multi-functional (meth)acrylate monomer is selected from the group consisting of ethylene glycol dimethacrylate, ethylene glycol diacrylate, diethylene glycol dimethacrylate, diethylene glycol diacrylate, triethylene glycol dimethacrylate, triethylene glycol diacrylate, butanediol dimethacrylate, hexanediol diacrylate, trimethylolpropane trimethacrylate, trimethylolpropane triacrylate, pentaerythrityl tetramethacrylate, pentaerythrityl tetraacrylate, and combinations thereof.

8. The coating composition of claim 1, where the multi-functional (meth)acrylate monomer has a number average molecule weight in the range of 125 g/mol to 500 g/mol.

9. The coating composition of claim 1, where the coating composition includes 0.1 wt % to 3 wt % based upon the total weight of the solids in the coating composition of the multi-functional (meth)acrylate monomer.

10. The coating composition of claim 1, where the oleophilic compound include is selected from the group consisting of paraffin waxes, microcrystalline waxes, carnauba waxes, beeswax, lanolin, whale oil, a polyolefin waxes, ceresin, candelilla waxes, Fischer-Tropsch waxes, montan waxes, polyethylene waxes, paraffinic oils, napthanic oils, aromatic oils, plant oils, animal oils, synthetic hydrocarbon oils, and combinations thereof.

11. The coating composition of claim 1, where the mono-functional (meth)acrylate monomer that has a boiling point of 120° C. or more at atmospheric pressure is selected from the group consisting of benzyl methacrylate, hydroxyethyl methacrylate, and combinations thereof.

12. The coating composition of claim 1, where the coating composition further includes a polymeric bead.

13. The coating composition of claim 1, where the coating composition further includes a filler.

14. The coating composition of claim 1, where the coating composition further includes a mono-functional (meth)acrylate monomer with a boiling point of less than 120° C. at atmospheric pressure.

15. The coating composition of claim 1, where the coating composition further includes an additive selected from the group consisting of UV stabilizers, defoamers, pigments, dyes, anti-slip agents, anti-static agents, adhesion promoters, tackifiers, plasticizers, flow aids, wetting aids, rheology modifiers, nucleating agents, leveling agents, air releasing agents, fire retardants, thixotropic boosters, polymerization inhibitors, rheological additives, and combinations thereof.

16. A method of preparing a coated substrate comprising:
    applying a coating composition to a surface of a substrate, the coating composition comprising:
    10 wt % to 95% wt % based upon the total weight of the solids in the coating composition of a mono-functional (meth)acrylate monomer that has a boiling point of 120° C. or more at atmospheric pressure;

0.2 wt % to 5 wt % based upon the total weight of the solids in the coating composition of an oleophilic compound selected from a wax, an oil, or combination thereof;

1 pbw to 5 pbw based upon 100 parts by weight of the total weight of the solids in the coating composition of a solvent;

a multifunctional crosslinker selected from a multi-functional (meth)acrylate monomer, a multi-functional oligomer, and combinations thereof with the proviso that the multi-functional (meth)acrylate monomer does not exceed 5 wt % based upon the total weight of the solids in the coating composition; and a polymerization initiator.

17. The method of preparing a coated substrate of claim 16, where the coating composition cures to produce a non-tacky surface coating.

18. The method of preparing a coated substrate of claim 16, where the substrate is selected from wood, concrete, masonry, metals, plastics, ceramics, composites, asphalt, gypsum board, brick, insulation board, and tile.

19. The method of preparing a coated substrate of claim 16, where the substrate is a roof.

20. A coated substrate comprising:
a substrate that includes a surface;
a coating on the surface of the substrate, the coating formed from the reaction product of a coating composition that includes:
10 wt % to 95% wt % based upon the total weight of the solids in the coating composition of a mono-functional (meth)acrylate monomer that has a boiling point of 120° C. or more at atmospheric pressure;

0.2 wt % to 5 wt % based upon the total weight of the solids in the coating composition of an oleophilic compound selected from a wax, an oil, or combination thereof;

1 pbw to 5 pbw based upon 100 parts by weight of the total weight of the solids in the coating composition of a solvent;

a multifunctional crosslinker selected from a multi-functional (meth)acrylate monomer, a multi-functional oligomer, and combinations thereof with the proviso that the multi-functional (meth)acrylate monomer does not exceed 5 wt % based upon the total weight of the solids in the coating composition; and a polymerization initiator.

21. The coated substrate of claim 20, where when cured the coating has a non-tacky surface.

* * * * *